MICROWAVE TRANSMISSION AND RECEIVING SYSTEMS

Filed Aug. 6, 1957 2 Sheets-Sheet 1

INVENTOR.
THEODORE HAFNER
BY
ATTORNEY

MICROWAVE TRANSMISSION AND RECEIVING SYSTEMS

Filed Aug. 6, 1957

2 Sheets-Sheet 2

INVENTOR.
THEODORE HAFNER

United States Patent Office 2,921,979
Patented Jan. 19, 1960

2,921,979

MICROWAVE TRANSMISSION AND RECEIVING SYSTEMS

Theodore Hafner, New York, N.Y.

Application August 6, 1957, Serial No. 676,541
24 Claims. (Cl. 179—2.5)

This invention relates to microwave transmission and receiving systems and more particularly to a system in which the signals are transmitted along a substantially horizontal predetermined longitudinal path and the signals are received from such longitudinal path on a moving receiver station travelling near and parallel to such longitudinal path.

One of the objects of the invention is to provide a surface wave transmission system suspended along poles with a field extending therefrom in a perpendicular direction over a predetermined distance and to provide a surface wave receiving system on a moving vehicle or object travelling along and within that surface wave field.

Another object of the invention is to provide a surface wave transmission line extending along the poles of an existing railroad installation and to provide a surface wave field extending over one of several tracts so as to be received on a vehicle adapted to move along this railroad and equipped with a receiver station adapted to receive the signals from the surface wave field with a minimum of loss and with a minimum of distortion.

A further object of the invention is to provide a stationary surface wave transmission line of predetermined field extending along the poles of an existing railroad line and to provide on a vehicle or carriage adapted to move on this railroad a receiving line of substantially longitudinal extension extending in the direction substantially parallel to the stationary surface wave transmission line and having one end extending into the air and the other end provided with a surface wave receiving or launching means adapted to receive or launch a surface wave thereon.

Still another object of the invention is to provide on such movable vehicle or carriage a surface wave transmission line extending over several wave lengths and of the operating frequency or frequency range and having at both ends surface wave receiving and launching means arranged around which permit reception and launching as the case may be of surface waves from the adjoining stationary surface wave field and the feeding of such surface waves after suitable conversion into concentrated waves to the corresponding receiver or transmitter equipment arranged on or within the vehicle or carriage.

These and other objects of the invention will be more fully described in the drawings annexed herewith in which.

Figures 1, 2, 3, 4, 5, 6, 7, 8:
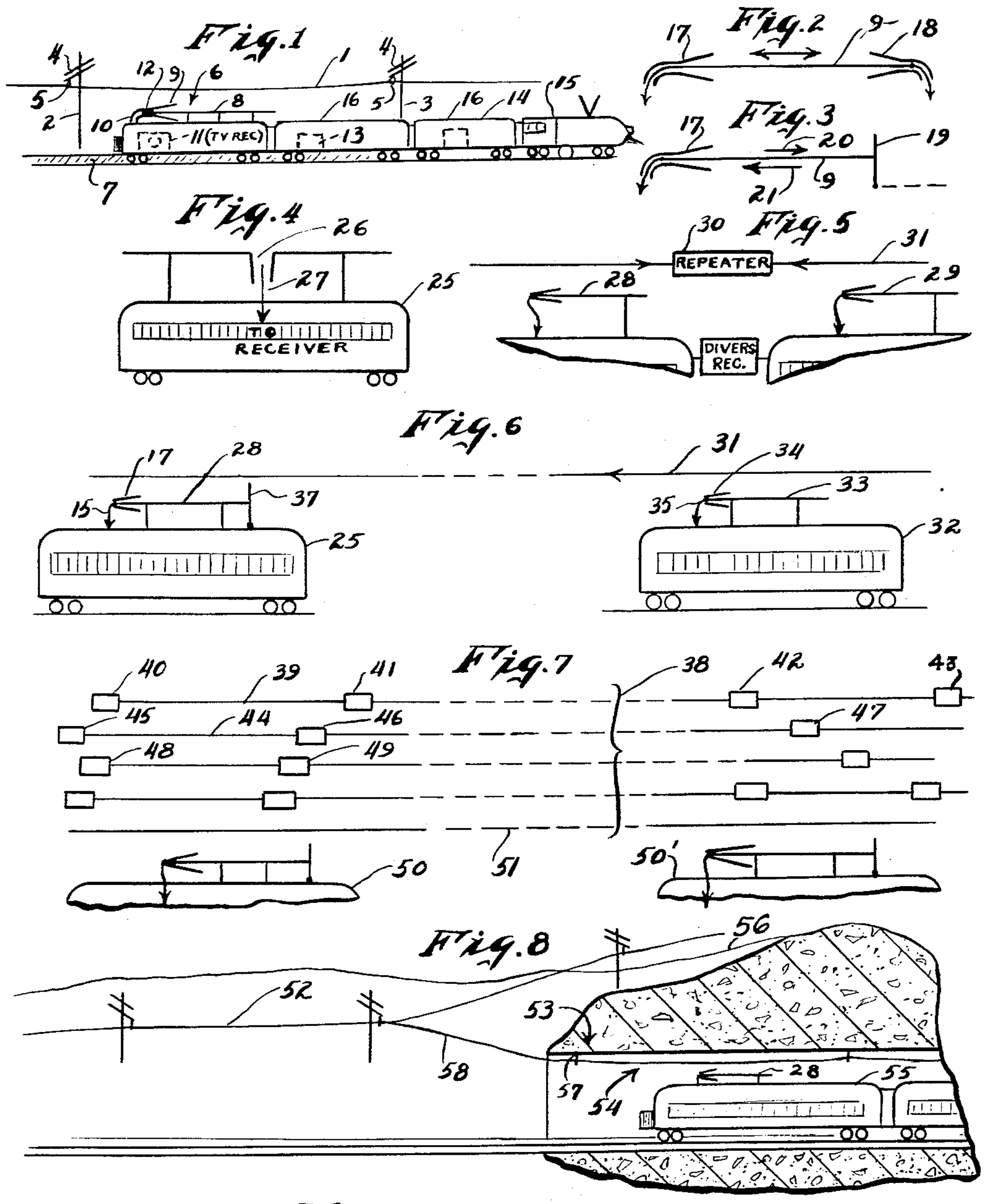
Fig. 1 represents a surface wave transmission and receiving system embodying certain features of the invention.
Figs. 2 to 6 represent modifications of Fig. 1.
Fig. 7 illustrates a circuit diagram permitting reception and transmission of television, telephone and any other type of signals alternatively, selectively or simultaneously, all this in accordance with the invention.
Figs. 8 and 9 represent embodiments of the invention involving passage through a tunnel and under a bridge, respectively.
Figure 9:
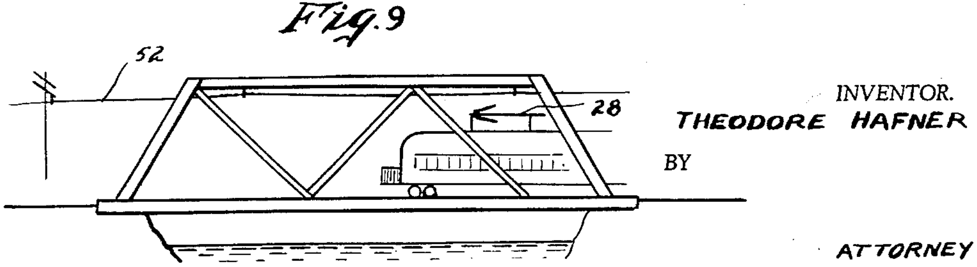

In Fig. 1, part 1 represents a surface wave transmission wire such as described and illustrated in U.S. 2,685,068 and in United States Serial No. 577,561, Serial No. 597,567, and in other pending patent applications of which the present application is a continuation in part.

Surface wave transmission wire 1 is suspended on poles 2 and 3 and more specifically on arm 4 by means of nylon loops 5.

In accordance with the invention the distance of wire 1 from other objects should be of the order of wave length dimension if possible not less than half a wave length in order to reduce interference and attenuation to a minimum.

At the same time, in accordance with the invention, the surface wave field may be given any desired extension depending upon the distance to be covered by the surface wave field and the amount of coupling desired between the moving vehicle and the surface wave conductor 1.

Thus, for example, in railroad operation it has been found that a surface wave field radius of a dimension of at least one wave length of the operating wave length or wave length range has been found particularly advantageous.

In the application of the surface wave transmission to a road where a larger surface wave field may be required a surface wave field radius of about twice and three times the wave length has been found to be required and realizable in accordance with this invention.

However, although these preferred wave lengths have specific advantages, the invention is not limited to the wave length shown and described but may be applied in any form or manner whatsoever without departing from the scope of this disclosure.

In Fig. 1 there is shown schematically a vehicle 6 which is arranged to move along track 7 which may be a highway, lane, or a railroad track, as the case may be.

On the top of carriage 6 there is arranged at a suitable distance from the roof of the carriage 7, of about half a wave length and even less, a surface wave conductor 8 or substantially similar structure than that of wire 1, which has arranged thereon at one end a receiving horn schematically indicated at 9, which together with surface wave conductor 8 forms a coaxial line which may be led in the form of a coaxial cable 10 of more or less standard construction matching with the impedance of the horn output, to the inside of carriage 7 where it may be attached to a television receiver as schematically indicated at 11.

Instead of coaxial cable 10 a matching wave guide may be used or a matching twin line—all this without departing from the scope of this invention.

If required, between coaxial cable or wave guide 10, (the coaxial output formed between the end of surface wave conductor 8 and horn 9) there may be arranged an impedance transformer such as is schematically indicated in Fig. 1 at 12 to match the impedance of the horn output to the impedance of the coaxial cable 11 and the equipment connected thereto.

In addition, or alternatively, the coaxial cable 10 may be connected to a telephone, telegraph or Teletype receiver schematically indicated in Fig. 1 at 13, and it may serve, generally, there to transmit television, telephone, Teletype, telegraph or any other type of signalling communications while the train or carriage is in movement.

Also if desired, and especially in the case of a railroad, coaxial cable 11 may be connected to other carriages of the same train and finally to the locomotive schematically indicated at 14 and 15 respectively, thereby also permitting the personnel of the train to receive information, instructions or signalling and if necessary also to permit the transmission of automatic signals for the equipment of the train, all this without departing from the scope of this disclosure.

In view of the fact that the surface wave transmission line 1 has an extremely broad band width, for example, and in the case of a so-called VHF line, which has been developed with a low attenuation frequency range from 100 to about 300 mc., in accordance with the invention around forty television channels or at least 400 telephone or signalling channels will be transmitted from a stationary surface wave transmission line to a moving vehicle.

In addition to its receiving function, a horn of the type shown at 9 may also be used as a transmitter and over the same surface wave line 8 signals may be transmitted from the inside of the carriage, derived for example from a camera or a Teletype or telephone transmitter, or a measuring instrument schematically indicated at 16, to transmission line 1 and from there, under control for example of a predetermined carrier frequency, to any desired stationary or movable point or station of the system, tuned to that carrier frequency. In order to be able to receive and/or transmit in both directions of the stationary surface wave transmission line 1, as apparent from Fig. 2, the moving surface wave transmission conductor 9 is provided at both ends thereof with horns 17, 18 or other appropriate launching and receiving devices which may serve as both receivers and transmitters respectively, and thereby still further facilitate and enhance transmission and reception of a great number of channels of a suitable band width.

Furthermore, as apparent from Fig. 3 reception of surface waves with a single horn or surface wave receiver from an—with respect to the horn direction—opposite direction, can be accomplished by providing the free end of the moving surface wave conductor 9 with a reflecting conductor plate or wall 19, by which a signal travelling along the stationary surface wave conductor 1 in direction 20 is reflected back by wall 19 in direction 21 and into the receiving horn 17.

In accordance with a further feature of the invention, reflecting wall 19 may be made movable or removable into a horizontal position, shown in Fig. 3 in dotted lines, and a surface wave travelling in direction 24 may be received over this same conductor 9 and horn 17.

Similar considerations apply to the use of horn 17, conductor 9 and reflecting wall 19 for bi-directional transmission of surface wave from a moving vehicle onto a stationary surface wave transmission line.

Another way of launching and receiving surface waves on or from a stationary surface wave transmission line is illustrated in Fig. 4 where on the roof of a moving vehicle or carriage, schematically indicated at 25, there is arranged a more or less ordinary antenna, for example in the form of a dipole 26, the inner ends of which are connected over a two-wire line, such as a coaxial cable schematically shown at 27, to a receiver (or transmitter) arranged inside carriage 25.

In principle the field of a surface wave transmission line can be picked up by any antenna, provided the antenna is sufficiently close to the line and is properly positioned to respond to one of the field components of the surface wave.

However, an ordinary antenna, like a monopole or dipole would receive any external signal with the same efficiency or even better efficiency. The antenna would have to be quite close to the line to be sure that unavoidable variations of the distance would not result in a drop-out of the desired signal. On the other hand, if the antenna is very close small changes in the distance would cause strong variations in field of strength.

In order to avoid these difficulties an antenna system is used which is responsive primarily to the field of a surface wave.

This antenna consists in principle of a surface wave line having a wave conductor substantially of the same phase velocity as that of the surface wave to be received. In order to insure equality of the phase velocities over the entire frequency band, it is preferable to use for the receiving antenna substantially the same conductor which is used for the surface wave transmission line.

As apparent from experiments underlying the invention, in this way a complete power transfer from the G-line to the receiving antenna is possible, although not necessarily desired or required for the purpose of this invention.

In a specific embodiment of this invention, as illustrated for example in Fig. 5, two surface wave conductors 28 and 29 arranged on several cars apart may be used to insure continuous reception when the train passes repeater station 30 inserted in stationary surface wave transmission line 31. The reception of the two antennas 28 and 29 may be combined in accordance with one of the known methods used in diversity receiving systems.

Alternatively, single surface wave conductors may be provided of sufficient length extending over several cars, and over a length which is large against the intervals caused by the insertion of repeater station 30, so as to assure continuing reception even when passing a repeater station.

Generally, it should be noted, if the moving antenna is close to the roof of the car, its phase velocity changes and it may be necessary to modify the dimensions of the wave conductor, for example, by increasing its insulation to correct for this effect.

Another embodiment of the invention, as illustrated for example in Fig. 6, permits non-radiating transmission of surface wave signals from one vehicle and reception of such signals on another vehicle by way of using the surface wave field of a stationary surface wave transmission line, as a non-radiating transmission medium.

In Fig. 6, for example, a surface wave conductor 28 is shown as receiving signals from the interior of vehicle 25 over coaxial cable 15 and horn 17. The signal wave is transmitted over the surface wave field of stationary surface wave transmission line 31 arranged along the path of vehicle 25, and is picked up by another vehicle 32 traveling along the same path by means of surface wave conductor 33, horn 34 and coaxial connection 35.

Similarly, transmission and reception in opposite direction can be achieved by connecting reflector plates to the free ends of surface wave conductors 28 and 33, as schematically indicated in Fig. 6 at 37 for surface wave conductor 28.

The circuit diagram of Fig. 7 shows a specific surface wave transmission and receiving system for railroad control in accordance with the invention.

There again a stationary surface wave transmission line is shown at 38, arranged along the railroad track or tracks including on a single wire a number of transmission channels serving different signalling purposes.

For example, a number of carrier channels symbolized by line 39 and distributed over a band width or 150–158 megacycles may be used to provide telephone and Teletype communications between the different railroad stops exemplified at 40 to 43.

The band width between 160 and 168 mc. forming a broad line 44 may be reserved for a number of signalling channels operating various signal devices schematically indicated at 45 to 47, and arranged stationary along the railroad tracks.

The frequency range of 170 to 178 megacycles may serve to provide closed circuit television entertainment in both directions of the stationary line, and of programs emitted from stations schematically indicated at 48 and 49.

These television programs may be picked up by stationary drops connected to waiting rooms and other railroad facilities, but, at the same time, the surface wave field corresponding to that frequency band may also be picked up by moving trains 50 and 50′ in the manner disclosed in Figs. 1–6 or in any other appropriate manner, according to this invention.

Finally, another frequency band, for example, extending from 180 to 220 mc., may be used for train intercommunication and communication between trains and stations in the manner, for example, indicated in Fig. 7 at 5.

Since the surface wave transmission line is capable of transmitting non-radiatingly an extremely broad band width, for example, in the case of a specific VHF model commercially available over a band width of 100 to 300 mc. with the rather low attenuation of 4–10 db per mile, depending upon whether a #4 or #6 polyethylene coated copper wire is being used, the invention is not limited to the number and type of channels illustrated and described, but may be applied in any form or manner whatsoever without departing from the scope of this disclosure.

The modification of Fig. 8 illustrates transmission to and reception from a stationary surface wave transmission line 52, extending along a railroad passing through tunnels, or under bridges or any other underpasses, as schematically indicated in Fig. 8 at 53.

In this case, in order to permit pick-up of the surface wave from the moving train, either the entire line 52 may be passed through the tunnel in space 54 between train 55 and tunnel wall 53, supported, for example, over the distance 56 on short polystyrene stubs 57 of say 10 inch length for a frequency range of say 100–300 mc., and in order to reduce attenuation, it will be necessary, for example, with the surface wave transmission line operative in the above-mentioned frequency range and having for example, an inner or wire diameter of .162 inch and an outer or coating diameter of .40 inch, to reduce the surface wave field corresponding to the thickness of the insulating coating, in order to prevent interference with the surface wave field due to the reduced distance of wire 56 from tunnel wall 53. Such distance should be, under the circumstances, and depending of course on the construction of tunnel wall 53, at least 2 to 3 feet. A distance of this size may usually not be available in the tunnel.

For these reasons, it will be necessary to reduce the extent of the surface wave field to permit reduction of the distance between the surface wave conductor and the tunnel wall.

Such reduction of the surface wave field may be accomplished in accordance with a further feature of the invention by increasing the thickness of the dielectric coating of the wire piece 56 from say ⅛ inch thickness to ¼ inch thickness, which will increase the relation between inner and outer diameter of the wire from the usual ratio of 2.5 to a ratio of 4.

Such field reduction, caused by increase of the ratio between inner and outer diameter of the surface wave conductor, will of course increase attenuation.

However, if required, and as a further feature of the invention, especially for the passage of relatively long tunnels and extensive length of surface wave conductor 56, the increased attenuation may be compensated, at least partially, by increasing the overall dimension of surface wave conductor 56, say from a #6 copper wire having a diameter of .162 inch to a #4 copper wire having a diameter of .25 inch. In the latter case, with an increased dielectric coating (ratio 4), the outer diameter will be increased to 1 inch and it will be possible at least, to some extent, to compensate for the loss in attenuation caused by the relative increase of the dielectric coating.

In order further to reduce interference and increased attenuation, the main surface wave transmission line 52 may be branched off prior to the approach of the tunnel by attaching, and, if necessary, also electrically connecting a branch wire 58 of dimensions similar to those indicated in Fig. 8 at 56 or of any other appropriate dimension, and passing this branch wire 58 through tunnel 53.

Branch-off 58 can be achieved either by attaching and guiding the wire piece 58 for several wave lengths along the main surface wave conductor 52 in front of tunnel 53, and after its passage through tunnel 53, again guiding and re-attaching the branch wire 58 in a similar manner to the main wire 52.

Figures 10, 11, 12, 13, 14, 15:
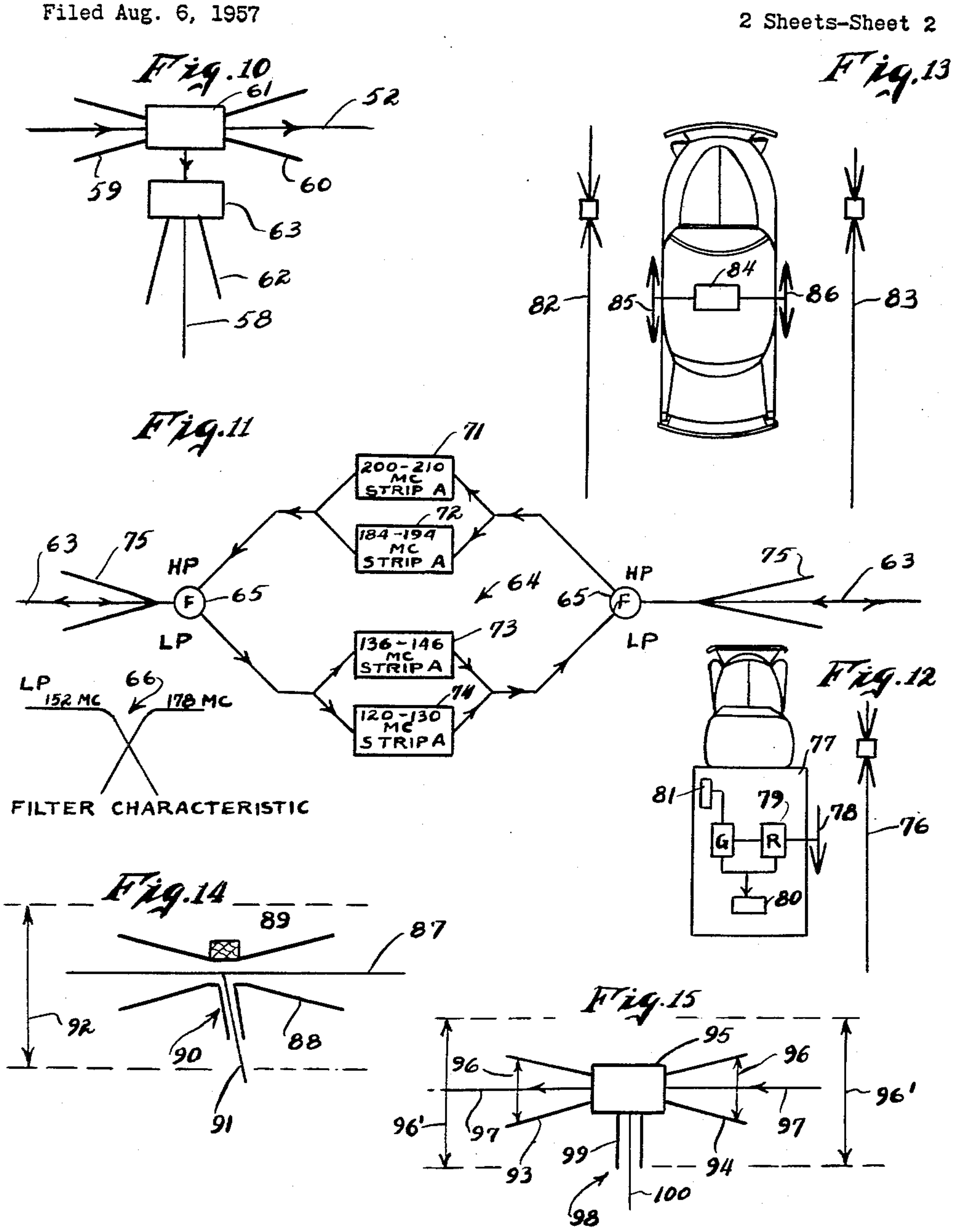
Fig. 10 represents a specific type of branch-off.
Fig. 11 illustrates transmission of several channels in opposite direction over a stationary transmission line.
Figs. 12 and 13 illustrate specific wave of direction determination for figures moving along stationary surface wave transmission lines.
Figs. 14 and 15 illustrate modifications of branch-offs from a stationary or moving transmission line, similar to that indicated in Fig. 10.

If necessary, such branch-off can be realized from an intermediate repeater station, such as indicated in Fig. 10, including a pair of horns 59 and 60 interconnected through another amplifier chassis 61 in the manner indicated in co-pending United States application Serial No. 577,571, filed April 11, 1956.

In the present case, this arrangement permits to branch off only a portion of the frequency spectrum of the main transmission line 52, for example, that of 180 to 222 mc. reserved for train station or intertrain communication, by means of an additional horn 62 connected over an appropriate filter 63 for the desired frequency range, to amplifier 61.

Surface wave conductor 58, if desired, modified in accordance with the principles set forth above for low loss tunnel transmission to keep the receiver signal constant, will extend from horn 62 and then pass through tunnel 52 and later on be re-attached to main transmission line 52 in the manner stated above, or in any other appropriate manner without departing from the scope of this disclosure.

Fig. 11 illustrates the transmission in opposite direction of several surface waves upon a single stationary surface wave transmission line 63′ covering a total transmission range of say 150–250 mc. inserted in this transmission line at the different repeater points, one of which is schematically indicated at 64, there are two filters 65, each having the charatceristic indicated at 66 and providing each two separate wave paths 67, 68 and 69, 70, respectively, to each pair of chain or strip amplifiers 71, 72 and 73, 74, respectively, each covering a band width sufficient for color television and extending say from 200–210 mc., 180–194 mc., 136–146 mc., and 120–130 mc., respectively.

Filters 65 are connected to surface wave conductors 63′ over horns 75, which act as launchers as well as receivers for non-radiating surface waves in otherwise well-known manner.

Similarly, by connecting only one filter of the type indicated in Fig. 11 at 65 to the receiving surface wave conductor arranged on a carriage or vehicle in the manner shown in Figs. 1 to 10, the received surface waves may be split up for separate indication and utilization.

It is also possible without departing from the scope of this invention to provide automatic indicating means, for example, speed indicators on these various vehicles, such as locomotives, automobiles, which under control of surface wave signals and pulses of predetermined character, for example, as apparent from Fig. 12 of pulses of constant wave shape and pulse repetition frequency transmitted over a stationary surface wave transmission line 76 and received on the vehicle 77 over line 78 at receiver 79, and there compared in comparator 80 in otherwise well-known manner with a pulse repetition frequency derived from a pulse generator coupled to the speedometer 81 of the vehicle 77, or any other speed proportional device.

The result of this comparison will permit objective indication of speed and also, if necessary, transmission of any such speed indication to a central station, all this without departing from the scope of this disclosure.

It is further possible to use predetermined signals or pulses derived from the stationary surface wave as a source of guiding a vehicle through fog.

In this case, illustrated in Fig. 13, the frequency of the signals or pulses may be used to assure a predetermined speed or distance from the front vehicle, and the amplitudes of the signals or pulses may be used to secure a predetermined distance of the moving vehicle from the curb or from a stationary surface wave conductor located near by.

By providing two surface wave conductors 82, 83 on opposite sides of the road, the radial extension of the different surface wave fields produced by these conductors will define an exactly predetermined path between these two fields thereby giving assurance of the desired direction of travel to be taken by the vehicle, all this being accomplished without departing from the scope of this invention which is not limited to any particular frequency or amplitude range, nor to any specific measuring device. Such device is schematically indicated at Fig. 13 at 84 and connected to two mobile surface wave conductors 85, 86 for comparing or measuring frequencies or frequency ranges, or signal amplitudes or amplitude differences in a manner known per se or in a manner which can be easily applied by any one familiar with the art.

Fig. 14 shows a simple branch-off line from a surface wave transmission conductor 87 of more or less standard construction arranged to pass through a twin-horn structure schematically indicated at 88 which in turn is attached as shown at 89 to the cross arm of a railroad pole not shown.

A coaxial cable, as schematically indicated at 90, has an outer conductor 91 which is connected to twin-horn assembly 88 at a central point thereof in proper impedance and phase relationship with the surface wave characteristics of horn structure 88. The inner conductor 91 of coaxial cable 90 is connected to the surface wave conductor 87, thereby permitting a direct coaxial or concentrated take-off of the surface wave from the surface wave transmission system.

The true dimensions of horn structure 88 are preferably such as substantially not to affect the surface wave field of transmission line 87, such field being schematically indicated by diameter 92, which may be of a dimension of say one wave length, while the outer diameter of horn structure 88 may be only half a wave length or less.

The inner dimensions of horn structure 88 are impedance matched to the impedance of coaxial cable 90 in otherwise well-known manner.

In modified branch-off of Fig. 15, the horn structure consists of separate launching and receiving horns 93, 94 attached to an amplifier chassis in a manner indicated in United States Serial No. 577,571, or as schematically indicated at 95. Receiving and launching horns have both an outer diameter which, as schematically indicated in Fig. 14 at 96, is small compared to the wave length or to the diameter 96' of the main surface field of surface wave conductor 97.

Coaxial branch-off cable 98, in this case, is attached to the amplifier circuit with the other conductor conductively connected to horns 93 and 94 and the chassis of amplifier 95, and the inner conductor 100 being connected, properly matched, to an appropriate input, output or intermediate terminal of the amplifier circuit.

In this way, it is not only possible to provide simple feed-in and feed-out connections for the main surface transmission line 97, but also to provide, with least loss, shunts permitting the surface wave energy to feed through an underpass, a tunnel or any other bypass, in accordance with the invention and in accordance with a planned layout, all this substantially without disturbing the main surface wave transmission field.

I claim:

1. In a microwave transmission system, a stationary surface wave transmission line extending longitudinally in a direction substantially parallel to the ground along a predetermined longitudinal path, a vehicle adapted to travel along said path and having on its top arranged thereon a surface wave transmission line of substantially the same phase velocity, including surface wave receiving means and coaxial means connected thereto; said surface wave transmission lines having substantially nonradiating surface wave fields dimensioned to interact with each other; and, inside said vehicle, means for at least receiving a surface wave transmitted from said stationary surface wave transmission line.

2. System according to claim 1, comprising a dipole forming a surface wave transmission line.

3. System according to claim 1, comprising a surface wave conductor of several wave length extension and surface wave receiving means connected thereto at least at one end thereof.

4. System according to claim 1, comprising surface wave receiving means connected at both ends of said vehicle line.

5. System according to claim 1, comprising surface wave receiving means connected at one end of said vehicle line and surface wave reflecting means connected at the other end thereof.

6. System according to claim 1, wherein said surface vehicle surface wave receiving means includes a cylindrical horn.

7. System according to claim 1, wherein said movable surface wave receiving means includes a surface wave conductor extending over several wave lengths.

8. System according to claim 1, wherein said stationary surface wave transmission line has a field diameter of at least wave length dimension.

9. System according to claim 1, wherein said stationary surface wave transmission line has a field of a dimension extending substantially over the width of said path.

10. System according to claim 1, wherein said stationary surface wave transmission line has a diametrical dimension of at least one wave length.

11. System according to claim 1, wherein said stationary surface wave transmission line includes means for transmitting and receiving surface waves, there being provided along said line and connected thereto space intermediate amplifiers for transmitting and receiving surface waves of different frequency ranges in opposite directions over said same stationary surface wave transmission line.

12. System according to claim 1, comprising stationary surface wave transmission lines arranged on both sides of said path.

13. System according to claim 1, comprising stationary surface wave transmission lines arranged on both sides of said path and also serving as power supply lines.

14. System according to claim 1, wherein said surface wave transmission line consists of two surface wave conductors twisted around each other at a lay of the order of wave length dimension, said two conductors serving as power supply lines while forming at the same time a single surface wave transmission line.

15. System according to claim 1, comprising another surface wave conductor coupled to the stationary surface wave transmission line at agreed divided point and gradually deviating therefrom at an increasing distance over a distance of several wave lengths, and after extending over a pre-determined distance substantially parallel to the same line, being thereby forming a shunt line again connected to said main surface wave transmission line by gradually approaching it over a distance of several wave lengths so as to permit the take-off of a pre-determined amount of shunted surface wave energy, substantially without disturbing the field of the main transmission line.

16. System according to claim 1, comprising an auxiliary surface wave transmission line extending parallel to said surface transmission line and connected at both ends to the main transmission line, said auxiliary transmission line having an attenuation which is substantially less than the attenuation of the main transmission line.

17. System according to claim 1, comprising an auxiliary surface wave transmission line connected in shunt with the main stationary transmission line and having an attenuation which is substantially the same as the attenuation of the main transmission line, but which has a field diameter substantially smaller than that of the main transmission line.

18. System according to claim 1, comprising an auxiliary surface wave transmission line in shunt with said main transmission line, and having an attenuation which is substantially lower than that of the main transmission line and which also has a field which is diametrically substantially smaller than that of the main transmission line.

19. System according to claim 18, wherein said auxiliary surface wave field is caused by a ratio between inner and outer diameter of the surface wave conductor, which is larger than the corresponding ratio of the main transmission line.

20. System according to claim 19, wherein said ratio of the main transmission line is 2.5 and the ratio of the auxiliary transmission line is at least twice as much.

21. System according to claim 1, comprising an auxiliary surface wave transmission line in shunt with said main transmission line and connected at both ends thereof to said main transmission line by means of an amplifier which has launching and receiving means extending therefrom in opposite directions and also has an additional launching means connecting said amplifier to said auxiliary transmission line.

22. System according to claim 21, wherein said auxiliary transmission line has a receiving means connected at the other end thereof to an intermediate amplifier having launching and receiving means connected thereto and also connected to the stationary surface wave transmission line at both its output and input ends, respectively.

23. System according to claim 1, comprising a coaxial cable connected in shunt with said surface wave transmission line, said coaxial cable having an inner conductor connected at least at one end to said stationary surface wave transmission line, respectively, and having an outer conductor connected at least at one end to said surface wave receiving and transmitting means, respectively, thereby producing a surface wave field which is small compared to the surface wave field of the surface wave transmission line, and permitting field coupling to said surface wave transmission line, substantially without disturbing the field of said stationary surface wave transmission line.

24. System according to claim 24, comprising an intermediate amplifier arranged at at least one of the points of field inter-coupling.

References Cited in the file of this patent

UNITED STATES PATENTS

| | | |
|---|---|---|
| 829,192 | Allen | Aug. 21, 1906 |
| 1,803,832 | Affel | May 5, 1931 |
| 1,870,832 | Brindley | Aug. 9, 1932 |
| 1,962,611 | Nyman | June 12, 1934 |
| 1,985,241 | Daya | Dec. 25, 1934 |
| 2,201,472 | Browder | May 21, 1940 |
| 2,398,741 | Halstead | Apr. 16, 1946 |
| 2,685,068 | Goribau | July 27, 1957 |

OTHER REFERENCES

FMI Railway Radio, FM and Television, September 1947, page 32.